May 27, 1969  R. HECHT  3,446,075
APPARATUS FOR ABSOLUTE PRESSURE MEASUREMENT
Filed Feb. 1, 1967  Sheet 1 of 4
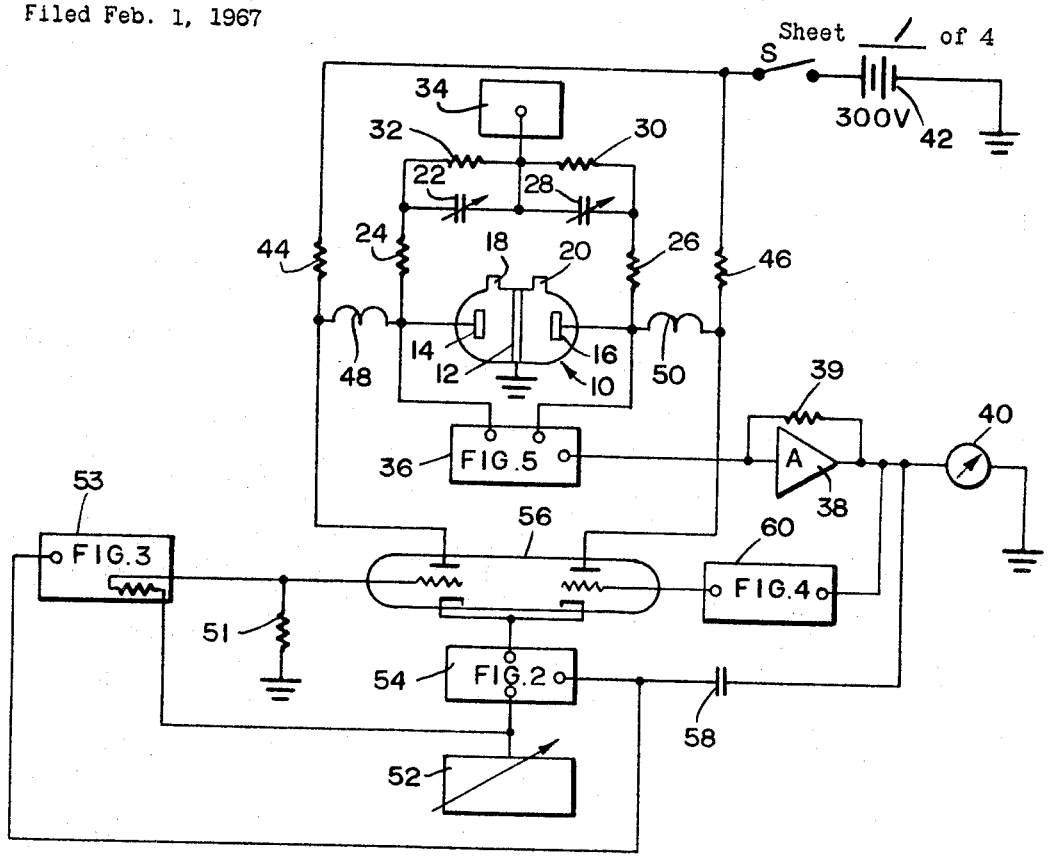
FIG. I
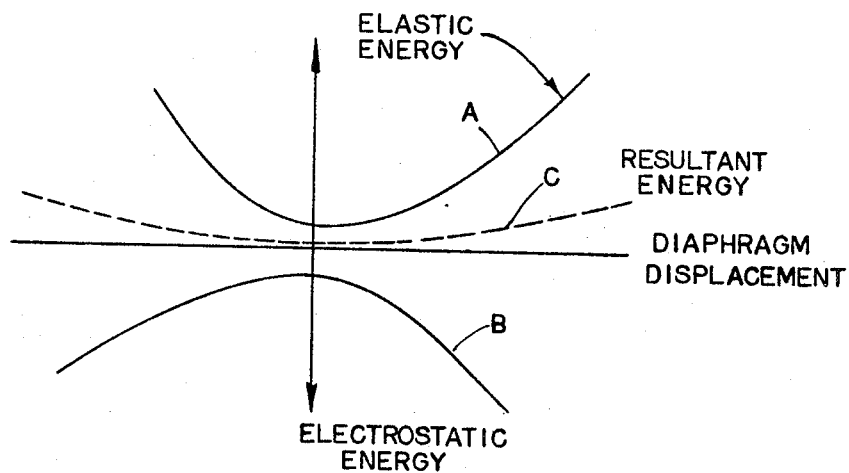
FIG. IA United States Patent Office 3,446,075
Patented May 27, 1969

3,446,075
APPARATUS FOR ABSOLUTE PRESSURE
MEASUREMENT
Richard Hecht, Waltham, Mass., assignor to National
Research Corporation, Newton Highlands, Mass., a
corporation of Massachusetts
Filed Feb. 1, 1967, Ser. No. 613,235
Int. Cl. G01l 9/00
U.S. Cl. 73—398                                    14 Claims

ABSTRACT OF THE DISCLOSURE

An absolute pressure sensor (e.g., the diaphragm of a capacitance manometer) is subjected to a superimposed potential to effectively reduce the mechanical stiffness of the sensor. This substantially increases the sensitivity of the sensor and is particularly useful in vacuum gauges. An oscillating component of the superimposed potential induces vibrations of the sensor. The phase of these vibrations with respect to that of the oscillating component is monitored, and serves to initiate an automatic adjustment of the static component of the superimposed potential, so as to bring the sensor into resonance at the frequency of the oscillating component. This serves to establish a selected sensitivity for the sensor, since a definite relationship exists between resonant frequency and sensitivity.

---

The present invention relates specifically to absolute pressure measuring devices used for measuring a gas density level in the high vacuum range ($10^{-3}$ torr down to $10^{-6}$ torr). The invention also has application to a wide range of vacuum gauges for other ranges and other fluid pressure sensitive devices and to the use of such devices for non-pressure measurements such as electric field measurements.

There are several known absolute pressure measuring devices utilizing mechanical sensors such as a piston, a diaphragm with sealed edges, a freely suspended flap, etc. All these devices find a lower limit for pressure detection given approximately by $$P_\text{noise} \approx (w/A[(MkT)\ \text{exp.}\ \tfrac{1}{2}]$$

where P is a noise level pressure signal, $w/2(\text{pi})$ is the natural vibrating frequency of the sensor, A is the effective fixed dimension area of the sensor exposed to the pressure to be measured, M is the effective mass of the sensor, k is the mechanical stiffness of the sensor and T is the absolute temperature prevailing in the sensor and measurement zone. A much higher lower limit for detection, $P_\text{min}$ is given by the minimum, detectable displacement of the sensor. Provided that the instrument is not limited by a fundamental source of noise, such as thermal noise, one can, in principle, improve its signal-to-noise ratio. Now $P_\text{min}$ decreases as $f^2$, while $P_\text{noise}$ decreases as $f$ where $f$ is the resonant frequency of the sensor. Therefore, it will always be possible in principle to observe thermal noise limit by reducing the resonant frequency of the sensor sufficiently. The crux of the matter is that if static pressures are to be measured, one simply has no need of a broadband pressure sensor, and since bandwidth has been introduced at the cost of sensitivity, one *ought* to seek to reduce the resonant frequency of the instrument. Now there are practical limitations on the maximum area, minimum weight and minimum detectable displacement for static pressure sensors, so that if the theoretical noise limit of detectable pressure is to be approached, one must seek to reduce the stiffness k.

According to the present invention the displacement of such sensors is increased by reducing the effective stiffness k of the sensor. This is preferably done electrically by applying an electrostatic force to the sensor which tends to increase its amplitude of motion, thus simulating a reduced mechanical stiffness. This increases the practical sensitivity of measurement.

Consider a metal diaphragm whose rest position is midway between a symmetrical pair of electrodes. If a common voltage is applied to the electrodes the electrostatic energy of the diaphragm will be a maximum at the rest position, while the elastic energy will be a minimum. Hence, applying the voltage reduces the energy *gradient* in the neighborhood of the rest position, i.e., reduces the available restoring force on the diaphragm. If pressure is applied to one side of the diaphragm, the diaphragm will move further, but more sluggishly, than in the absence of voltage. Thus, the sensitivity of the diaphragm is increased, very much as if the tension in the diaphragm had been reduced. However, the restoring force on the diaphragm is here provided by the *difference* between two energy gradients, each of which will have inevitable uncertainties, so that the relative uncertainty in sensitivity will increase in direct proportion to the sensitivity itself. To avoid this self-defeating process, it will be necessary to monitor the sensitivity. A method, which does not interfere with the continuous measurement of pressure, is to induce and observe mechanical resonance of the diaphragm; the sensitivity can be precisely inferred from the value of the mechanical resonance frequency. For example, a conventional diaphragm gauge which has a minimum detectable pressure of $10^{-3}$ torr and a characteristic resonant frequency of 1000 cycles per second can be electrostatically "softened" to the point where the minimum detectable pressure is $10^{-6}$ torr and the characteristic resonant frequency is, say, 30 cycles per second. An oscillating component is applied to the superimposed potential and this drives the sensor at resonant frequency.

A second significant aspect of the present invention is that the measurement is now based on invariant quantities—a selected resonant frequency, fixed linear dimensions and a fixed mass. These quantities determine the major term in the theoretically predicted sensitivity, while the natural resonant frequency determines minor correction terms.

For a circular metal membrane of radius $a$ and mass per unit area $\mu$, faced on both sides at a distance $d$ by flat electrode discs of the same radius $a$, the following results have been derived: Under a differential pressure P, the difference $\Delta C$ between the two capacitances formed by the diaphragm and the two electrodes is given by:

$$\Delta C = .361 \frac{Pa^2}{\mu w^2 d^2}\left(1 - .072\frac{w_o - w}{w_o} + \cdots\right),\ w \to w_o$$

$$\Delta C = .346 \frac{Pa^2}{\mu w^2 d^2}(1 + .305\ (w/w_o)^2 + \cdots),\ w \to 0$$

where $w/2(\text{pi})$ is the resonant frequency to which the diaphragm is electrostatically tuned, and where $w_o/2(\text{pi})$ is the natural resonant frequency of the diaphragm.

The features in the invention which are novel are set forth with particularity in the appended claims. The invention itself, however, together with further objects and advantages thereof, may best be understood by reference to the following specific description, taken in connection with the accompanying drawings in which:

FIG. 1 is a simplified schematic circuit diagram of a preferred embodiment of the invention, as applied to a diaphragm gauge with a capacitance bridge readout.

FIG. 1A is a broadly schematic curve showing the effect of softening the mechanical diaphragm by the application of electrostatic forces;

Figure 2:
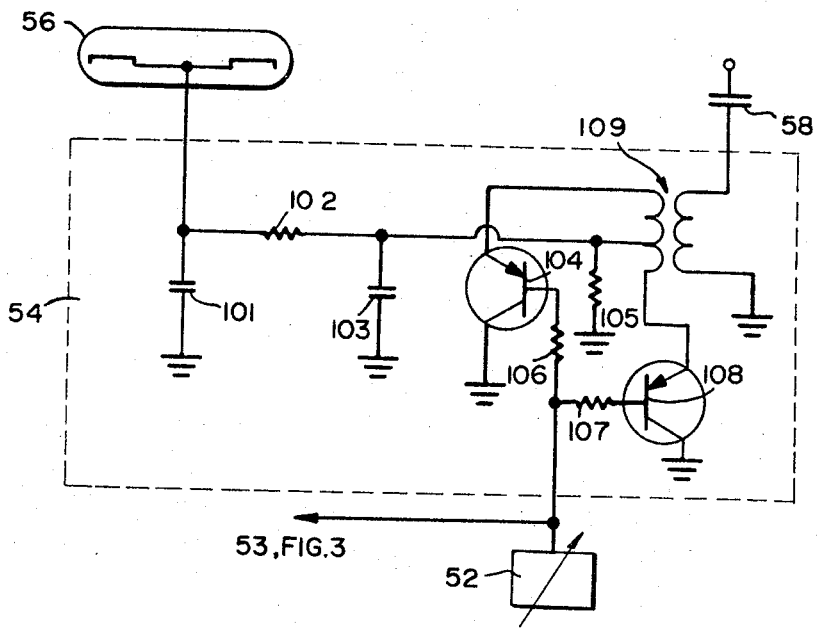
FIGS. 2–5 are circuit diagrams of blackbox components of the FIG. 1 circuit.

Referring now to FIG. 1, there is shown a diaphragm vacuum gauge with a capacitance bridge readout (i.e., a capacitance manometer modified by the present invention. The gauge is shown at 10 and comprises a stiff metal diaphragm 12 and a pair of capacitor electrodes 14, 16. Opening 18 connects the gauge to the vacuum to be measured and opening 20 connects the gauge to a source of reference vacuum. The capacitors formed between 14–12 and 16–12 are part of a bridge circuit which is completed by resistor 24, capacitor 22, capacitor 28, resistors 26, 30, and 32, an RF oscillator voltage source 34, an RF detector 36, an amplifier 38 with a feedback resistor 39 and a meter 40. The elements thus far described are conventionally incorporated in vacuum gauges of this type.

In accord with the present invention, there is added to the capacitance monitor circuit a means to reduce the diaphragm stiffness which comprises a voltage source 42, with resistors 44, 46 between the voltage source and the respective electrodes 14 and 16. Radio frequency choke coils 48 and 50 isolate the bridge from disturbances but pass the modulating voltages applied via 42–44 and 42–46. There is also added a frequency selector 52 and a phase detector 54, the latter being connected to the amplifier output via a capacitor 58. These elements induce a variation of the modulating voltage applied to the diaphragm so that the output motion of the diaphragm is in resonance with that driving frequency. The indication of resonance is that the diaphragm motion (or, more specifically, the waveform in the amplifier 38 output corresponding to diaphragm motion) is 90 degrees out of phase with the frequency selected by oscillator 52. Phase detector 54 continually monitors this condition of phase quadruture and, as necessary, modulates the voltage applied to electrodes 14, 16 via twin triode tube 56 to continuously tune the diaphragm to resonance at the selected frequency. With resonance automatically assured, the pressure sensitivity of the diaphragm can be computed as a known function of the selected frequency, the fixed dimensions of the diaphragm and electrodes, and the diaphragm mass.

The circuit elements for FIG. 1 are:

| | |
|---|---|
| 10 | Lion Research 110,–CAP–0.05D differential pressure capsule. |
| 22, 28 | 100 picofarad capacitors. |
| 24, 26 | 5K resistors. |
| 30, 32 | 2K resistors. |
| 34 | General Radio (330A bridge oscillator). |
| 38 | Nexus SQ–10 amplifier. |
| 39 | 51K resistor. |
| 40 | Keithley 600A electrometer. |
| 44, 46, 57 | 47K resistors. |
| 48, 50 | 19 millihenry choke coils. |
| 52 | Hewlett Packard 200 CD audio oscillator. |
| 56 | 12 AX 7 twin triode. |

FIG. 1A shows in a qualitative sense the effect of applying voltage to the electrodes 14 and 16. Curve A is the function of elastic energy vs. diaphragm displacement. As the diaphragm is displaced in either direction, its mechanical elastic energy increases. Curve B shows the electrostatic energy applied by the voltage source. This essentially subtracts from the elastic energy. The resultant energy, indicated by curve C, increases less rapidly with diaphragm displacement than does the elastic energy. Hence, the diaphragm is displaced further under a given pressure, so that the sensitivity of the diaphragm has been increased.

Referring now to FIG. 2, the construction of the phase-detector is shown in detail. The circuit elements are:

| | |
|---|---|
| 101 | 10 microfarad capacitor. |
| 103 | .01 microfarad capacitor. |
| 102, 105, 106, 107 | 1K resistors. |
| 104 | 2N3646 transistor. |
| 108 | 2N3640 transistor. |
| 109 | Triad HS56 transformer. |

Figure 3:
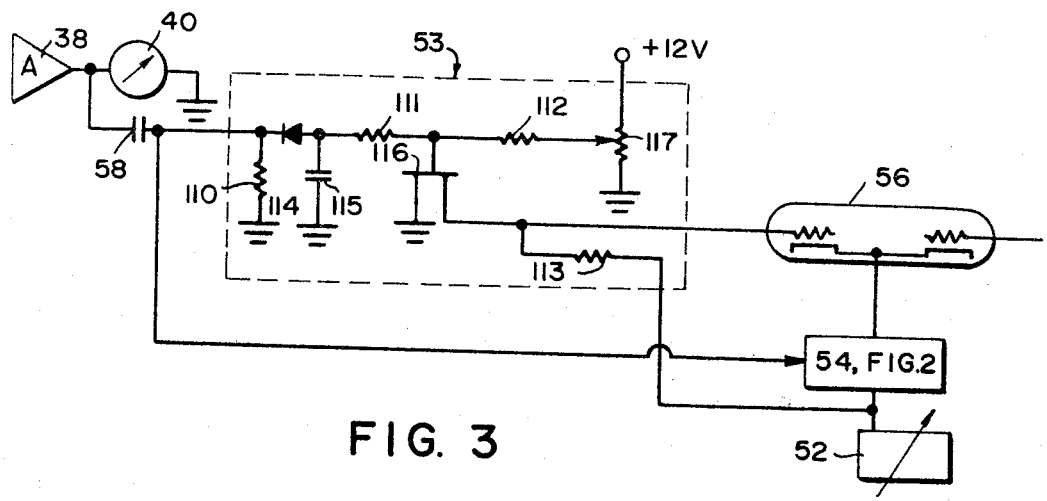

Referring now to FIG. 3, the construction of the gain control circuit is shown in detail. The circuit elements are:

| | |
|---|---|
| 110, 111, 112 | 47K resistors. |
| 113 | 1 meg resistor. |
| 114 | IN695 diode. |
| 115 | 10 microfarad capacitor. |
| 116 | 2N2608 field effect transistor. |
| 117 | Zero to 10K pot. |

This circuit is essentially a voltage divider between oscillator 52 and the lefthand grid of twin triode 56, consisting of resistor 113 and transistor 116 in series. The transistor resistance is controlled by the output of diode detector 114 which senses the output of amplifier 38.

Figure 4:
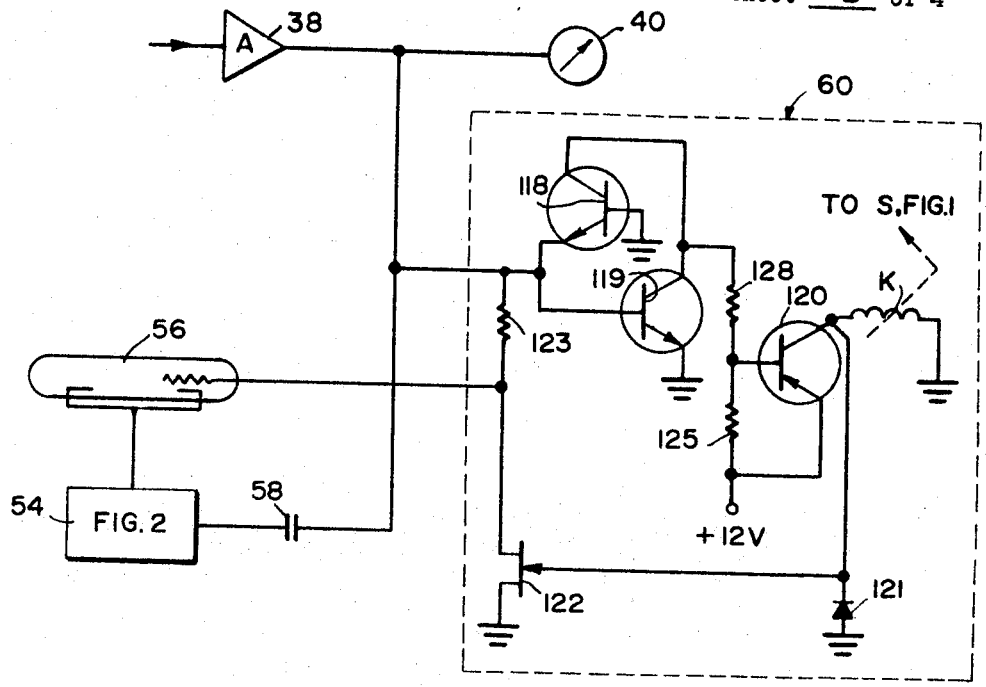

Referring now to FIG. 4, there is shown in detail a construction of the overpressure control circuit for driving a relay K to cut off power to the various circuits of FIG. 1 by relay operated switches (not shown). The circuit elements are:

| | |
|---|---|
| 118, 119 | 2N3646 transistors. |
| 120 | 2N3640 transistor. |
| 121 | IN695 diode. |
| 122 | 2N2608 field effect transistor. |
| 123 | 1 meg resistor. |
| 124 | 2.7K resistor. |
| 125 | 15K resistor. |

The relay is activated whenever the amplifier output is greater than 0.6 volts, plus or minus.

When the relay is activated a +12v is placed on the gate to the field effect transistor which drives the transistor to a high impedance. This allows the output of the operational amplifier to be placed on the right hand grid through resistor 123. This signal should be large enough to electrostatically drive the diaphragm to the null position.

Figure 5:
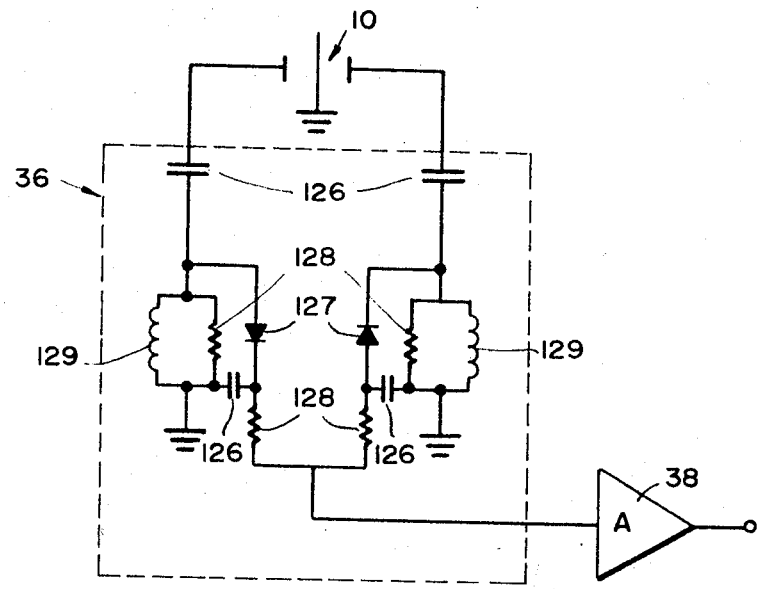

Referring now to FIG. 5, the construction of the radio frequency detector is shown in detail. The circuit elements are:

| | |
|---|---|
| 126 | .001 microfarad capacitors (4). |
| 127 | FA2000 diodes. |
| 128 | 51K resistors. |
| 129 | 10 millihenry coils. |

Figure 6:
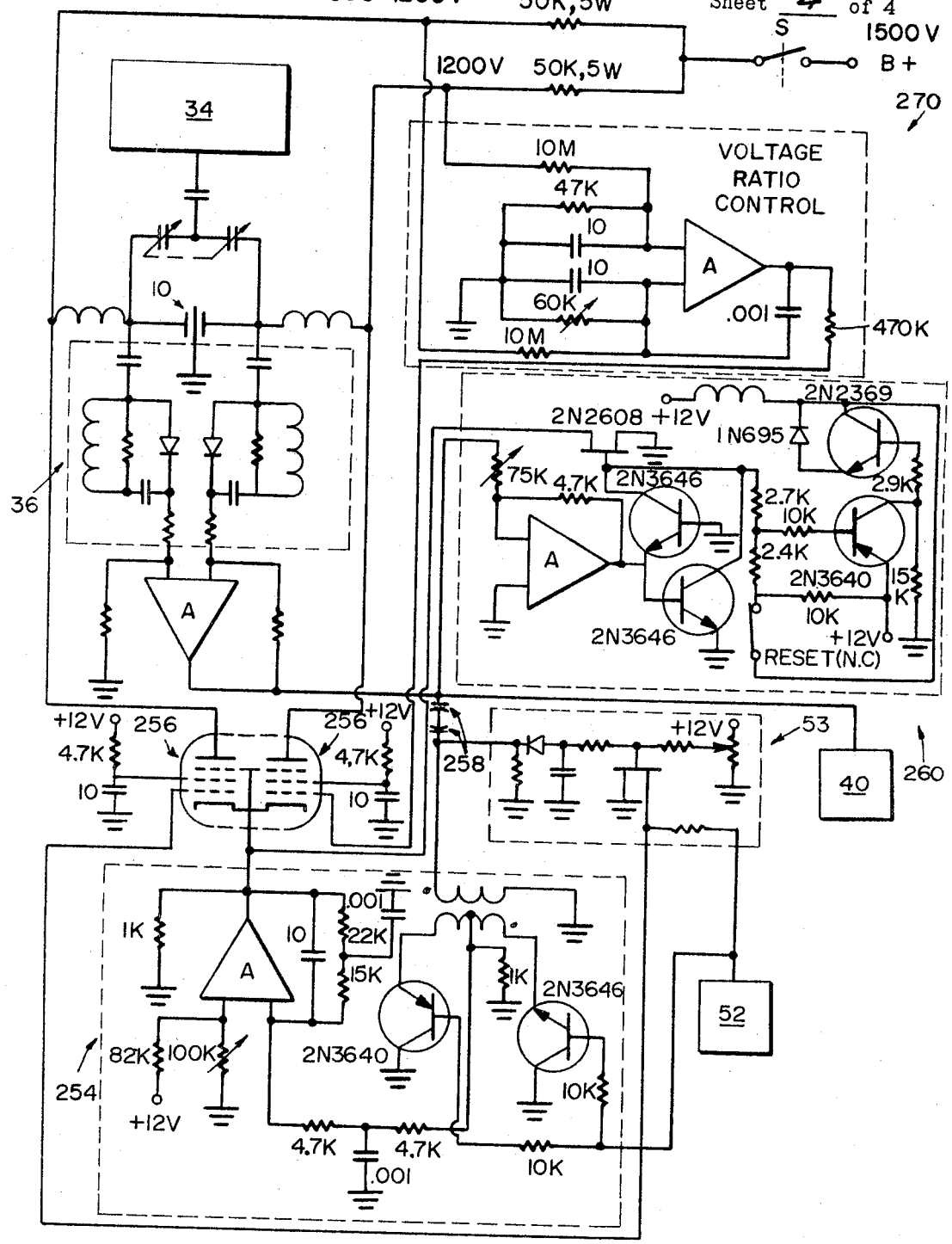
FIG. 6 is a circuit diagram of a second and preferred embodiment of the invention.

A second embodiment of the invention is shown in FIG. 6. The parts 10, 34, 36, 40, 52, 53 and S are as in the FIG. 1 embodiment with simple variations as clearly shown in the drawing. The amplifiers A are all preferably Nexus SQ–10a. The capacitors 258 are 10 microfarads each. Two 6C135 pentodes are substituted for the twin triode 56 of FIG. 1. Modified phase detectors and overload circuits are provided at 254 and 260 respectively. These modifications are explained below. A new circuit 270 is added for voltage ratio control. This feedback circuit fixes the ratio of the static voltages applied at the two electrodes of the capacitance monitor. By means of this ratio control circuit the effects of electrostatic field unbalance caused by mechanical misalignment of the electrodes (which will inevitably occur to some extent) can be minimized. To make this correction, the variable 60K resistor is adjusted so as to minimize the change in diaphragm position with variation in softening voltage.

The modified overload protection circuit shown at 260 cuts off conduction to both electrodes of the gauge 10 via the connection from phase detector circuit 254 to both cathodes of the pentodes 256, reducing the cathode potential to ten volts in case of overload. Should the output of the RF detector 36 exceed, positively or negatively, a predetermined safe value, the 2N2608 field effect transistor of circuit is driven into conduction by the excess signal and grounds both cathodes. This causes a large increase in plate current of pentodes 256 and stiffens the diaphragm. At the same time, the relay in circuit 260 is activated via the 2N2369 and 2N3640 transistors to activate the relay coil to operate switch S at the top of the drawing. Operation of switch S, within a few milliseconds after increasing current drawn by the pentodes, cuts off all high voltage to protect all circuits from overload. The 1N695 diode protects transistor 2N2369 from damage due to a voltage spike in the relay coil.

Many modifications, changes and applications of the invention, in addition to those described above, will occur to those skilled in the art once guided by the present disclosure. For instance, the diaphragm could be stiffened by applying magnetic rather than electrostatic forces (provided that the diaphragm were magnetic). The nature of the softening forces must be such that as the diaphragm moves in one direction the effective force producing motion in that direction increases and the restoring force decreases. Another variation of the invention is that the sensitivity monitoring features thereof may be used to advantage even when there is no need for diaphragm "softening" to increase sensitivity. However, as a practical matter, a softening force is preferably applied to move to a condition of operation where large swings of resonant frequency or changes of conditions for inducing resonance can be detected.

Electrostatic "softening" of the mechanical sensor element can be achieved with both electrodes at either a positive voltage or a negative voltage with respect to the mechanical sensor element e.g., diaphragm. Therefore, any source of error which depends on the polarity of the electrode voltages can be eliminated by comparing the sensor output obtained with both electrodes positive against that obtained with both electrodes negative. Such an error could arise from an unpredictable change in work function at the electrode and/or diaphragm surfaces on admitting gas to the system. Depending on the polarity of the electrode voltages, this change in work function would either increase or decrease the electrostatic field between the electrode and diaphragm surfaces exposed to the gas. The change in electrostatic field would then produce an error in the indicated pressure or other parameter to be measured.

Therefore, as a further refinement of the invention it is desirable to apply the softening voltage cyclically so that the electrodes are alternatively positive and negative with respect to the sensor. This can be accomplished by holding the diaphragm at, say, 500 volts positive and alternating the electrode voltages between, say, 200 and 800 volts. Of course, it will be necessary to reverse the polarity of the feedback applied in the phase-detector (item 54, FIGS. 1 and 2; item 254, FIG. 6) synchronously with the alternations of the electrode voltage. Such reversals could readily be accomplished by a mechanical or electronic reversing switch. In addition, it would be highly desirable to maintain the diaphragm in continuous vibration throughout the cyclic variation. As a preferred way to accomplish this, the audio oscillator 52 output frequency could be raised to the natural resonant frequency of the sensor as the alternating electrode voltages approach 500 volts in the above example, and returned to its original setting as the electrode voltages approach 200 and 800 volts.

The changes in sign of softening voltage will produce an alternating component of the output signal corresponding to the change in work function, if any, arising from reactions at the respective diaphragm and/or electrode surfaces exposed to gas. The output circuit of the gauge can be provided with a filter to remove this alternating component due to work function or any other source of error which depends on sign of the electrode voltages.

Alternatively, the alternating component itself can be measured to determine the change in surface work function if this information is desired. In this case the above filter would be omitted.

The frequency selected for the above alternation of the softening of voltage should be at least twenty times smaller than the frequency used for control of resonance. In the capacitance manometers described in the species of FIGS. 1 and 6, wherein audio frequency is used for control of resonance, a typical value of frequency for alternation of softening voltage would be ten cycles per second.

Other uses of the invention include possible use in a voltmeter, magnetic field detector, Knudsen gauge, or a Golay cell. Still other uses within the scope of this invention will be apparent to those skilled in the art. Also, as noted above, many variations can be made in the structure of the invention's various embodiments. It is therefore intended that the above description and accompanying drawing shall be read as illustrative and not in a limiting sense.

What is claimed is:

1. In a device for measuring a physical condition comprising a mechanical sensor element adapted to be displaced in response to the physical condition to be sensed, means for detecting displacement of said sensor and producing an output signal corresponding to said displacement, the improvement comprising:
   (a) means for reducing the inherent stiffness of the sensor element by applying forces on opposite sides of the sensor wherein any movement of the sensor in one of two opposed directions results in an increase in the ability of such means to increase such movement and a decrease in the ability of such means to oppose such movement; and
   (b) means for monitoring and adjusting the sensitivity of the sensor element.

2. The apparatus of claim 1 wherein the device is a diaphragm gauge and the means (a) are electrostatic force fields applied to opposite sides of the diaphragm.

3. The apparatus of claim 1 wherein the means (b) for monitoring and adjusting sensitivity comprise means for vibrating the sensor element and controlling resonant frequency thereof.

4. The apparatus of claim 3 wherein the means (b) for monitoring and adjusting resonant frequency comprise means for applying a selected frequency component of force to force applied by said means (a) and means for tuning the sensor to resonance at said selected frequency.

5. The apparatus of claim 3 wherein the means (b) for monitoring and adjusting resonant frequency comprise means for applying a variable frequency component of force to force applied by said means (a) and means for measuring a condition of resonance.

6. The apparatus of claim 3 wherein the means (b) for monitoring and adjusting sensitivity further comprises means for automatically reducing the amplitude of sensor displacement as the tuning of the sensor approaches resonance.

7. The apparatus of claim 6 wherein the means (b) for monitoring and adjusting sensitivity further comprises means for automatically restoring natural stiffness of the mechanical response of the sensor in response to an emergency condition of operation of said device.

8. The apparatus of claim 1 wherein the means (b) for monitoring and adjusting sensitivity further comprising means for correcting any imbalance of the forces on opposite sides of the mechanical sensor at its null position and automatically maintaining the same correction as the inherent stiffness of the sensor is varied.

9. In a capacitance manometer comprising a diaphragm gauge with the diaphragm and each of two electrodes on opposite sides of the diaphragm forming two legs of a capacitance bridge and means for driving the diaphragm, the improvement comprising:

(a) means applying equal voltages to the two electrodes, and (b) means for monitoring sensitivity of the gauge by holding the diaphragm at a resonant frequency and measuring the parameters required to achieve resonance.

10. The apparatus of claim 9 wherein the means for monitoring sensitivity comprises means for automatically reducing the amplitude of sensor displacement as the tuning of the sensor approaches resonance.

11. The apparatus of claim 9 further comprising means for automatically removing the electrode voltage and restoring natural stiffness of the mechanical response of the sensor in response to an emergency condition of operation of said device.

12. The apparatus of claim 9 wherein the means for monitoring sensitivity comprises means for correcting any imbalance of the forces on opposite sides of the mechanical sensor at its null position and automatically maintaining the same correction as the electrode voltage is varied.

13. The apparatus of claim 10 wherein the means for monitoring sensitivity further comprises means for automatically removing the electrode voltage and restoring natural stiffness of the mechanical response of the sensor in response to an emergency condition of operation of said device.

14. The apparatus of claim 13 wherein the means for monitoring sensitivity further comprises means for correcting any imbalance of the forces on opposite sides of the mechanical sensor at its null position and automatically maintaining the same correction as the electrode voltage is varied.

References Cited

UNITED STATES PATENTS

| | | | |
|---|---|---|---|
| 2,567,253 | 9/1951 | Strange et al. | 73—398 |
| 3,295,360 | 1/1967 | Dimeff | 73—398 XR |

LOUIS R. PRINCE, *Primary Examiner.*

D. O. WOODIEL, *Assistant Examiner.*